Feb. 2, 1971  C. VAN DER LELY ET AL  3,559,389
DEVICE FOR WORKING CROP LYING ON THE GROUND
Filed Aug. 31, 1966  6 Sheets-Sheet 5

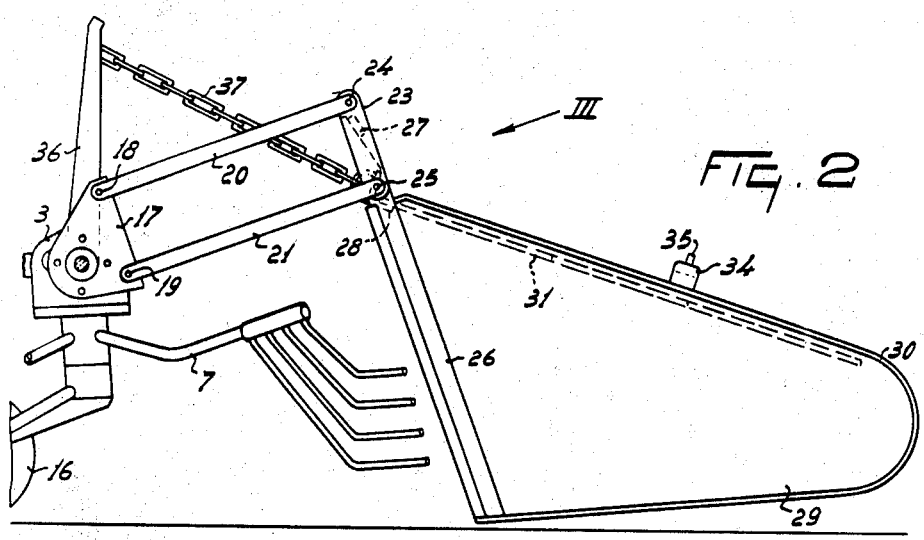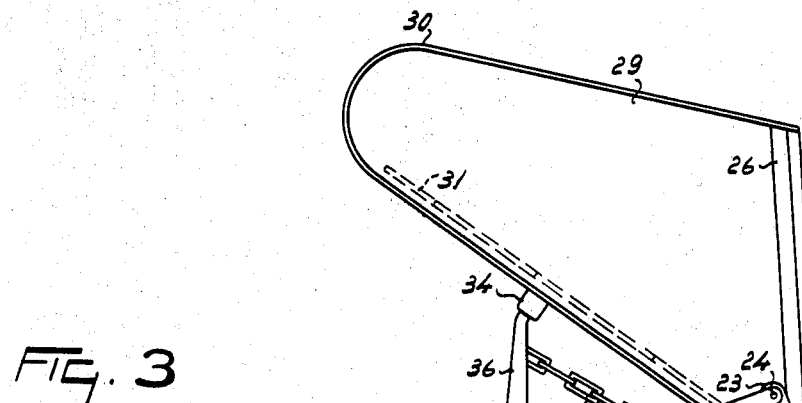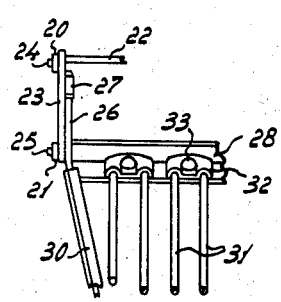

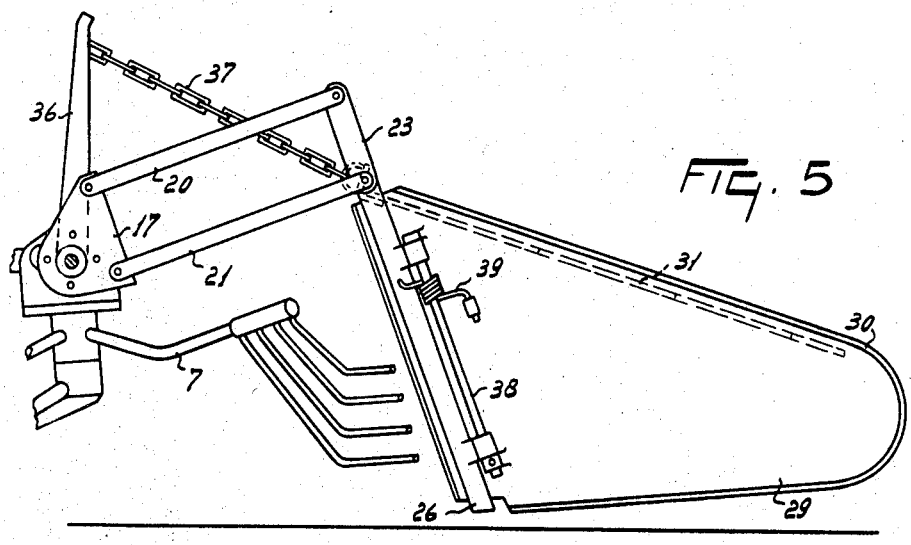
FIG. 5
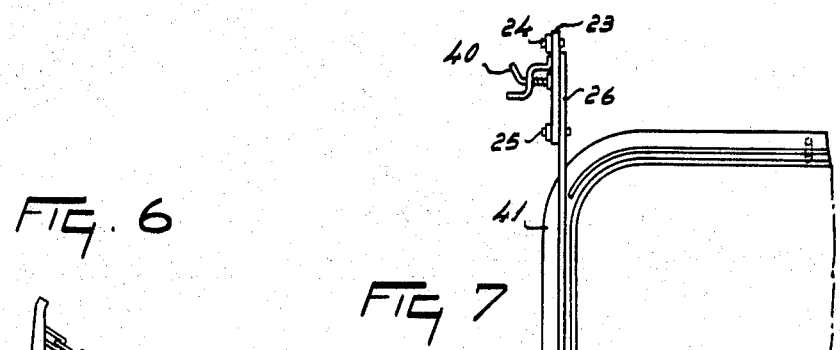
FIG. 6    FIG. 7
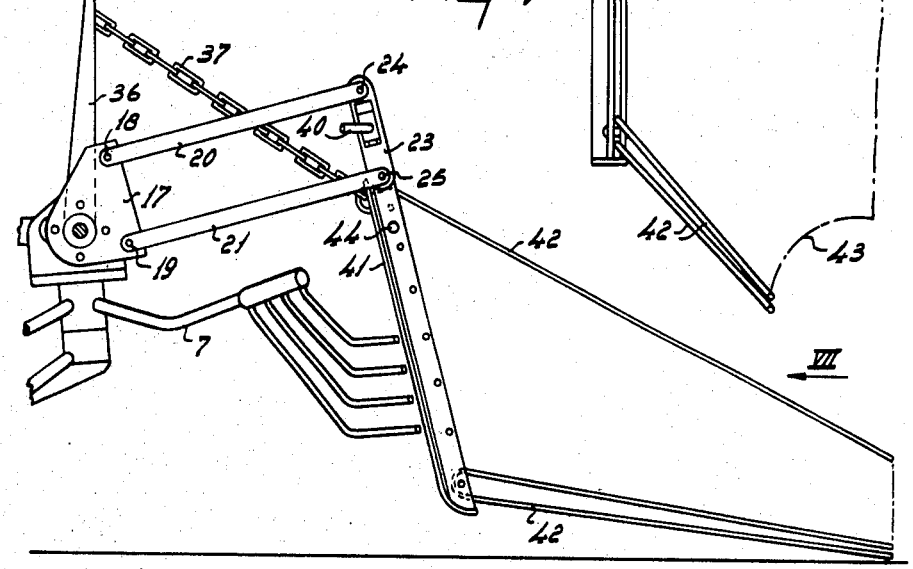
INVENTORS
Cornelis & Ary van der Lely &
Cornelis Johannes Gerardus Bom
BY
Mason, Mason & Albright
Attorneys

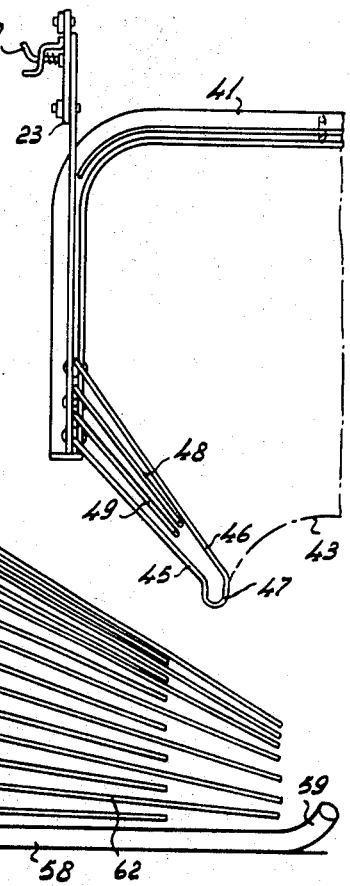

INVENTORS
CORNELIS & ARY VAN DER LELY &
CORNELIS JOHANNES GERARDUS BOM
BY
Mason, Mason & Albright
Attorneys

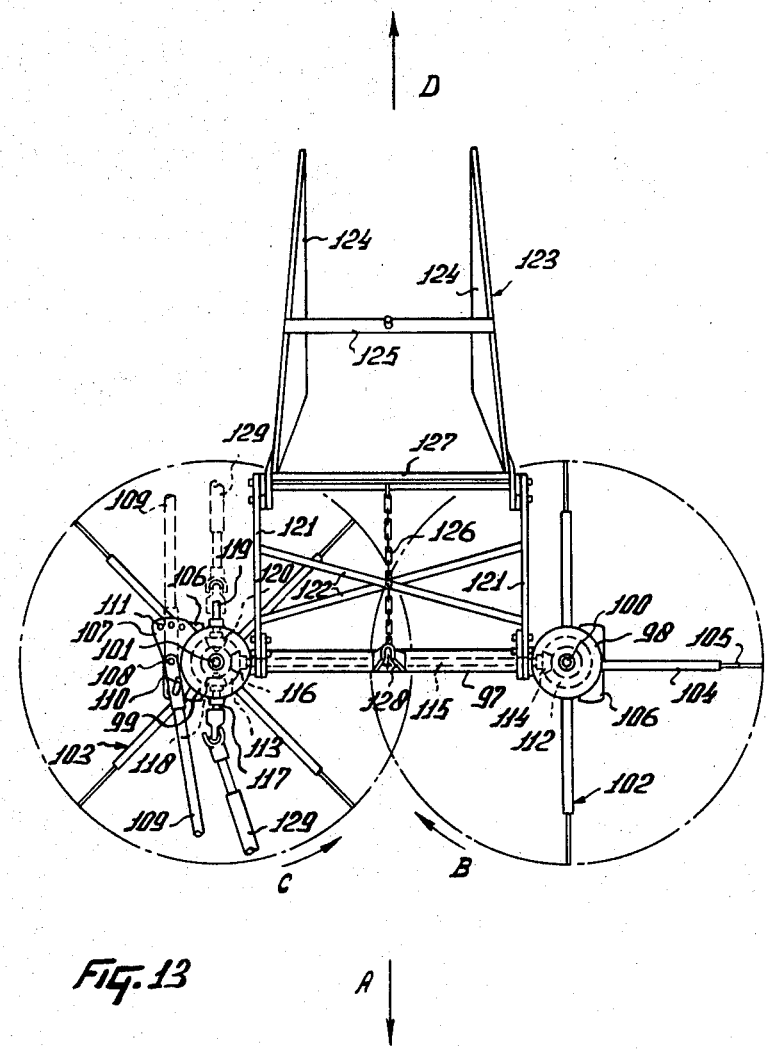

United States Patent Office 3,559,389
Patented Feb. 2, 1971

3,559,389
DEVICE FOR WORKING CROP LYING
ON THE GROUND
Cornelis van der Lely, Bruschenrain 7, Zug, Switzerland,
Ary van der Lely, Weverskade 10, Maasland, Netherlands; and Cornelis Johannes Gerardus Bom, Esdoornlaan 36, Rozenburg, Netherlands
Filed Aug. 31, 1966, Ser. No. 576,279
Claims priority, application Netherlands, Sept. 15, 1965,
6511984, 6511985; Sept. 22, 1965, 6512295; Oct. 13,
1965, 6513220
Int. Cl. A01d 79/00
U.S. Cl. 56—370                                    24 Claims

ABSTRACT OF THE DISCLOSURE

A device and method for working crop lying on the ground, the device including a plurality of rake members mounted on a frame to rotate in either direction to work and displace crop. A guide is located to the rear of the rake members and the guide is pivoted to move vertically relative to the frame so that crop can be displaced and guided onto a strip of ground narrower than the working width of the vehicle.

---

Figure 1:
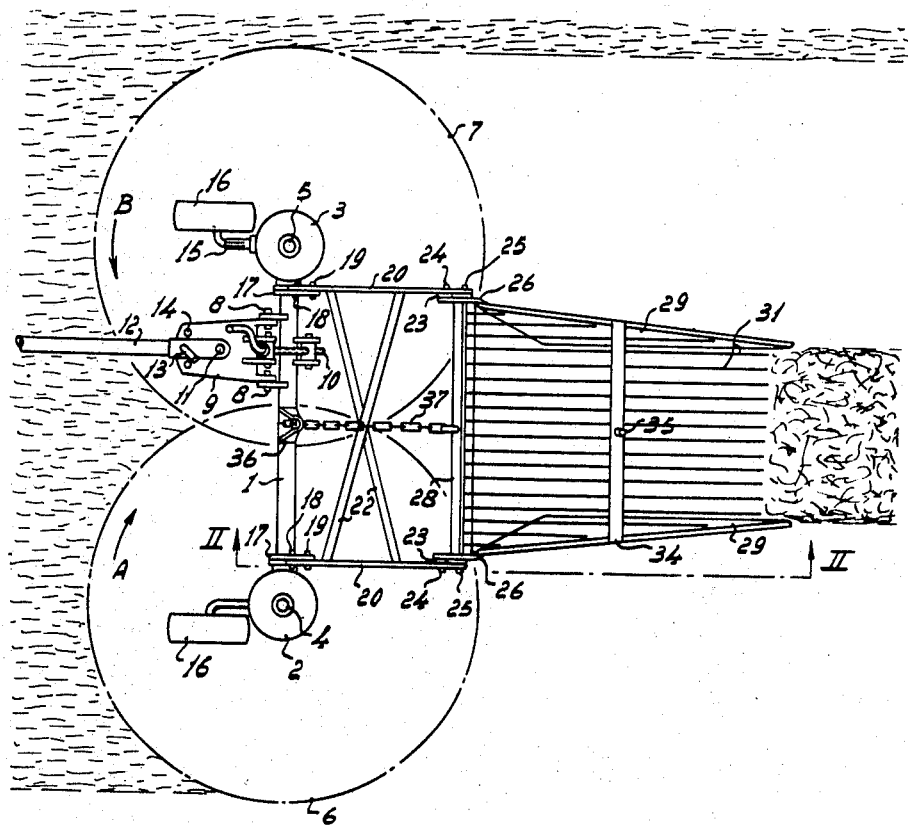

The invention relates to a device for working crop lying on the ground, comprising a frame and at least two rake members mounted in said frame for rotation about upwardly extending axes in such manner that crop engaging parts of the rake members are movable rearwardly with reference to the direction of operative travel of the device in a region disposed between the rake members.

The invention furthermore relates to a device for working crop lying on the ground, comprising a frame, a number of rake wheels coupled with said frame, and a guide member for crop displaced by said rake wheels, wherein the guide member has a resilient upper wall which extends downwardly with reference to the direction of movement of displaced crop relative to the guide member so as to urge or direct the displaced crop towards the ground.

In an embodiment of the invention, the guide member has a resilient upper wall, beneath which the crop displaced by the rake wheels during operation moves along. The wall extends obliquely downwards, viewed in the direction of movement of the crop below the guide member, and the crop is pressed against the ground by the resilient upper wall.

This permits of obtaining a compact swath which is particularly suitable for further treatment by other implements, for example, a baler.

The invention relates, still further to a device for working crop lying on the ground, comprising a frame and two rake members mounted in said frame for rotation about upwardly extending axes in such manner that crop-engaging parts of the rake members are movable rearwardly with respect to the direction of operative travel of the device in a region disposed between the two rake members, wherein a guide member for crop displaced by said rake members is located substantially behind the rake members with reference to said direction of travel and the guide member comprises two side walls which extend rearwardly of the device in a convergent manner so as to define a passage which becomes gradually narrower from front to rear, the lower edges of the side walls being located, in an operative position of the guide member, near the ground surface.

The invention relates further to a device for working crop lying on the ground, comprising a frame having a frame beam and two rake wheels mounted for rotation on said frame beam.

In accordance with the invention there is provided a device for working crop lying on the ground, comprising a frame beam, two rake wheels mounted on said frame beam, gear boxes on said frame beam, each gear box having a gear wheel connected to a corresponding one of the rake wheels, and transmission means drivingly interconnecting said rake wheels, wherein each gear box has a corresponding driving shaft connected thereto, and each driving shaft is adapted to be coupled to the power take-off shaft of a tractor or like propelling vehicle for moving the device during operation, so that the rake wheels can be rotated in either of two directions according to which of the driving shafts is connected to the power take-off shaft of the tractor or like propelling vehicle.

The invention further provides a method of working crop lying on the ground by means of a device comprising a frame and two rake members mounted on said frame for rotation in either of two relatively opposite directions about two upwardly extending shafts, comprising the steps of moving the device over the ground along strips of land which are spaced from each other by the working width of the device, with the rake members rotating in such manner that the crop engaging ends of the rake members move forwardly with reference to the direction of travel of the device in a region disposed between the rake members, so that crop lying on such strips is displaced onto the intervening unworked strips of land, and the further steps of moving the device over the unworked strips of land, after the crop has been displaced from the worked strips onto the unworked strips, with the rake members rotating in such manner that the crop on such unworked strips is picked-up by the rake members and is displaced rearwardly between the rake members against a guide member of the device which is disposed in an operative position so as to guide the displaced crop onto a strip of land narrower than the working width of the device.

The invention relates further to a device for working crop lying on the ground, comprising a frame and two mechanically driven rake wheels mounted in said frame so as to be rotatable about upwardly extending shafts.

In accordance with the invention there is provided a device for working crop lying on the ground, comprising a frame and two mechanically driven rake wheels mounted in said frame so as to be rotatable about upwardly extending shafts, wherein the device is provided with coupling means for connecting the device to a tractor or like propelling vehicle so that the device can be towed behind the tractor or the like, the coupling means being movable between two operative positions, so that the device can be towed with a normally forward end of the device facing the direction of travel with the coupling means in one of its two operative positions and the normally rear end of the device facing the direction of travel with the coupling means in the second of its two operative positions.

The invention relates further to rake wheels, rake heads and like rake members of the kind that are adapted to be rotated about non-horizontal axes, such rake wheels incorporating tines that are connected to a central region of the rake wheel by torsionally deformable spokes.

An object of the invention is to improve the capacity of the tines to follow undulations in the surface of the ground during use of an implement incorporating a rake wheel in accordance with the invention.

According to the invention, there is provided a rake wheel of the kind set forth, wherein the tines are connected to the spokes by tine supports which extend downwardly from said spokes in an operative position of the rake wheel, each tine being inclined to the corresponding tine support.

This also permits of obtaining a uniform, compact swath.

Figure 11:
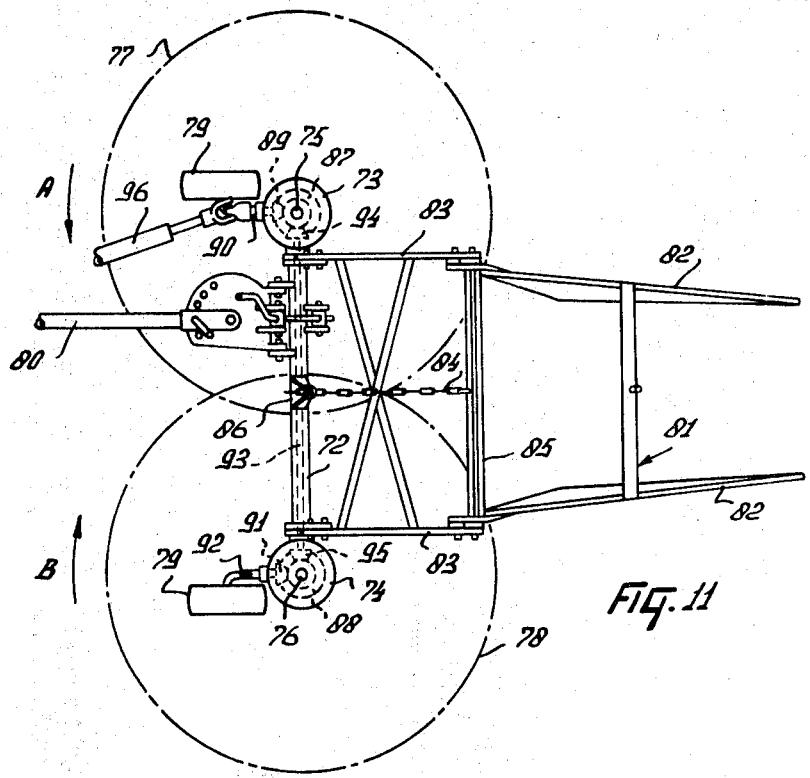
Figure 12:
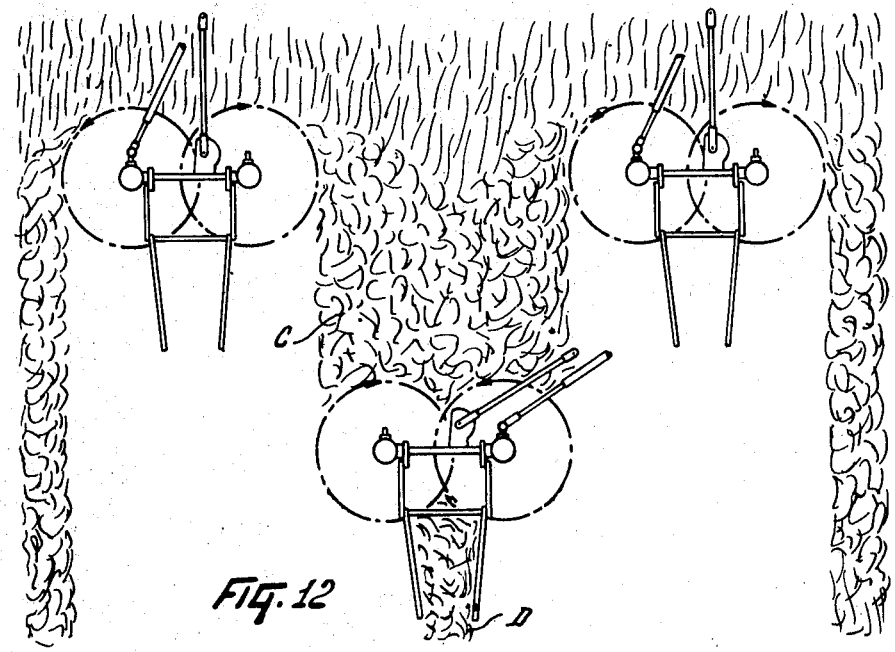

For a better understanding of the invention and the method by which the same can be performed, reference will now be made, by way of example, to the accompanying drawings, in which:

FIG. 1 is a plan view of a device according to the invention,

FIG. 2 is an enlarged sectional view of the device of FIG. 1 taken on the line II—II in FIG. 1, the drawbar being omitted for the sake of clarity, FIG. 3 shows part of the device of FIG. 2 in the direction of the arrow III in FIG. 2, FIG. 4 is a side elevation of the device in which a crop guiding member is shown in an upward inoperative position, FIG. 5 shows a side elevation of a second embodiment of the guiding member, FIG. 6 shows a side elevation of a third embodiment of a crop guiding member, FIG. 7 is an elevation of the member of FIG. 6 in the direction of the arrow VII in FIG. 6, FIG. 8 is an elevation of a fourth embodiment of a crop guiding member, FIG. 9 is an elevation of a fifth embodiment of a guide member for the crop, FIG. 10 is an elevation of a sixth embodiment of a crop guiding member, FIG. 11 is a plan view of a second embodiment of a device according to the invention, FIG. 12 illustrates different methods of working with the device, FIG. 13 shows a plan view of a third embodiment of a device according to the invention, The device for working crop lying on the ground shown in FIG. 1 comprises a frame beam 1, to the ends of which gear boxes 2 and 3 are secured. The gear boxes 2 and 3 accommodate the ends of shafts 4 and 5 respectively which extend obliquely upwards in operative positions. Rake members in the form of rake wheels 6 and 7 are adapted to rotate about the shafts 4 and 5 respectively, said members being shown only diagrammatically. A support 9 is coupled with the horizontal frame beam 1 by means of pins 8, extending parallel to the frame beam 1. With the aid of a screw threaded spindle 10, the support 9 can be turned about the pins 8. By means of a vertical pin 11, the end of a drawbar 12 is coupled with the support 9. The drawbar 12 can be locked in different positions against rotation about the pin 11 by means of a locking pin 13, which can be taken through a hole in the drawbar 12 and through one of holes 14 provided in the support 9. The gear box 3 accommodates a shaft 15, extending at right angles to the frame beam 1 and which projects at one end beyond the gear box 3 and is coupled with the rake wheel 7 by means of a gear wheel transmission housed in the gear box 3. The gear wheel transmission of the gear box 3 is furthermore coupled with the rake wheel 6 by means of a shaft journalled in the frame beam 1 and a gear wheel transmission in the gear box 2. The frame is supported by ground wheels 16, located beneath the rake wheels.

Near the ends of the frame beam 1, there are secured vertical plates 17 (FIGS. 1 and 2). To each of the plates 17 is coupled a pair of arms 20 and 21 by means of pins 18 and 19, lying one above the other and extending parallel to the frame beam 1. The arms 20 are uppermost and are interconnected by struts 22, located between the arms. The ends of the arms 20 and 21 remote from the plates 17 are coupled with plates 23 by means of pins 24 and 25, extending parallel to the pins 18 and 19. Arms 26 are adapted to turn about the pins 25. The ends of the arms 26 projecting above the pins 25 bear on cams 27, secured to the plates 23. The portions of the arms 26 located near the pins 25 are interconnected by means of an angle beam 28. The ends of the arms 26 projecting below the pins 25, are bent over slightly towards each other and said portions of the arms have secured to them plates 29, which are more or less triangular when viewed from aside so that one of the sides of a plate secured to an arm 26 extends parallel to the arm 26 concerned, while the plate 29 extends away from the arm to the rear. The edge 30 of each plate 29 is bent over at right angles so as to stiffen the plate. As seen in plan, the plates 29 extend away from their fastening point on the arms 26 obliquely to the rear in a converging manner. The upper edges of the plates are further remote from each other than the lower edges and the passage between the plates thus becomes gradually narrower with distance both downwardly and rearwardly.

The beam 28 has secured to it spring steel rods or bars 31, which are located, viewed from aside, approximately at the level of the upper edges of the plates 29 and, on plan, at right angles to the frame beam 1. Two adjacent bars 31 are integral with each other and are secured by means of a clamping element 32 and a bolt 33 to the beam 28. From the beam 28 the bars 31 extend freely to the rear in downward direction and are not supported at their rear ends.

A strip 34, extending, on plan, parallel to the frame beam 1, is located above the bars 31 and is secured at its ends to the plates 29. A pin 35 is secured to the center of the strip 34 and a support 36 is provided at the center of the frame beam 1 to co-operate with the pin 35. Between the support 36 and the beam 28 there is provided a chain 37, which can have its effective length altered so as to alter the relative disposition of the support 36 and strip 34.

The device described above operates as follows.

With the aid of the drawbar 12 the device can be attached to a tractor or a similar propelling vehicle and the power take-off shaft of the vehicle can be connected with the shaft 15 with the aid of an intermediate shaft. The transmissions to the rake wheels 6 and 7 are such that the rake wheels can be driven so that they rotate in the direction of the arrows A and B respectively. Crop lying on the ground in front of the device is picked-up and is carried along by the tines of the rake wheels and is displaced to the rear. The displaced crop is constrained so as to pass between the plates 29 and beneath the bars 31 which together comprise a guide member for displaced crop. The passage defined by the guide member having side walls constituted by the plates 29 and an upper wall constituted by the bars 31, is wide at the front and tapers to the rear. The passage also tapers or converges downwardly so that the crop is pressed or consolidated and is pressed slightly against the ground and is drawn along beneath the guide member. The crop is thus compressed to some extent, so that a compact swath is obtained, which can be readily worked further, for example, by a baler. Since the upper wall of the guide member is formed by spring steel bars, the shape of the passage can fairly match the quantity of crop, since each of the bars can deflect independently of the other bars. The guide member, including the plates 29 and bars 31, is furthermore capable of deflecting as a whole upwardly since the chain 37 only limits downward movement.

In order to ensure a satisfactory operation the spring steel bars must have adequate resilience. Therefore, the length of a bar is preferably more than 80 times its diameter. A satisfactory effect is obtained, for example, by means of circular cross-section spring steel bars having a diameter of 7 mm. and a length of 87 cm. Since the side walls of the guide member are formed by fixed plates, the swath obtained will have a substantially constant width.

The guide member may also be brought into an inoperative position shown in FIG. 4 by swinging it around the pins 25. In this position the pin 35 is received in an opening provided in the upper end of the support 36. This position is particularly suitable for the transport of the device. However, also in operation, the guide member may occupy such position if it is desired to spread the crop throughout the surface of the field by means of the device. The rake wheels will operate to displace crop rearwardly onto the ground without being gathered into swaths with the guide member in the transport position.

The embodiment shown in FIG. 5 corresponds substantially with the preceding embodiment and similar parts are designated by the same reference numerals. As will be apparent from FIG. 5, each plate 29 is pivoted to the corresponding arm 26 by means of a shaft 38, extending parallel to the arm 26. A spring 39 tends to hold the plate 29 in the position shown in the figure, but if a large quantity of crop is conveyed between the plates, the plate 29 is capable of deflecting sideways under the action of the forces exerted by the crop on the plate 29 so that the passage of the guide member can to some extent match the quantity of crop.

FIGS. 6 and 7 shows a third embodiment of guide member for the crop. The parts corresponding with those of the preceding embodiment are denoted by the same reference numerals. In this embodiment a locking pin 40 is secured to one of the plates 23. The end of the locking pin is taken through a hole provided in the plate 23 and a hole in the arm 26, extending along that plate 23. Between the two arms 26 there is arranged a angle beam 41. Spring steel bars 42 are secured to the beam 41 so as to extend away from said beam freely to the rear. The bars are arranged in pairs and two adjacent bars 42 are integral with each other and are clamped to the beam 41 with the aid of a connecting piece between the bars 42. With this guide member the passage defined between the bars tapers to the rear, since the bars forming an upper wall extend obliquely downwards and the bars forming the side walls extend in a converging manner. The free ends of the bars are located on a curved line 43. When the locking pin 40 is withdrawn from the hole in the arm 26, the guide member can be pivoted upwards about the pins 25 and be fixed in the tilted position by inserting the locking pin into one of the holes 44 in the arm 26.

In the embodiment shown in FIG. 8, the guide member is also built up mainly from spring steel bars. Corresponding parts are again designated by the same reference numerals. In this embodiment two bars 45 and 46 are interconnected by a connecting piece 47, which is located near the rear end of the guide member. The free ends of the bars 45 and 46 are secured to the angle beam 41. Between the bars 45 and 46 there are provided two shorter bars 48 and 49, which are also integral with each other. The connecting piece between the bars 48 and 49 is secured to the beam 41 and the bars extend away from the beam 41 freely to the rear. As will furthermore be seen from FIG. 8 the connecting piece 47 is bent over to the outside.

In the embodiment shown in FIG. 9 two arms 50 and 51 are pivoted with the aid of the pins 18 and 19 to each of the plates. The upper arms 50 are shorter than the lower arms 51. Between the arms 51 there is arranged a beam 51A to which the end of the chain 37 is fastened. Each pair of arms 50 and 51 is pivoted at the ends remote from the pins 18 and 19 to a connecting piece 54 by means of pins 52 and 53. By means of the pins 53 arms 55 are pivoted to the arms 51. The upper portions of the arms 55 extend parallel to the connecting pieces 54 in the position shown in the figure and are at an angle of about 30° to the horizontal. The lower ends of the arms 55 are bent over downwardly with respect to the upper portion and are disposed at an angle of about 80° to the horizontal.

A locking pin 56 is secured to one of the arms 55, the free end of said pin being taken through a hole in the arm 55 and a hole in the plate 54. A U-shaped bracket 57 is furthermore secured to the arms 55, said bracket having approximately the same shape as the beam 41. The lower ends of the U-shaped bracket have secured to them approximately horizontal pipes 58, which are integral with the pipe forming the U-shaped bracket 57 and form the lower rim of the side walls of the guide member. The rear ends 59 of the pipes 57 are bent over upwardly and slightly outwardly. Spring steel bars 61 and 62, forming the side walls and the upper wall of the guide member, like in the preceding embodiments, are secured to the portions of the arms 55 extending along the limbs of the bracket 57, and to a strip 60 which is secured to the part of the bracket located between the arms 55. Two adjacent bars 61 and 62 are formed by a single length of spring steel bent in a hairpin fashion, while the connecting piece between the bars 61 and 62 is fixed by means of bolts 63 to the arms 55 and the strip 60 respectively. From FIG. 9 it will furthermore be apparent that the lowermost bar 61 of two superimposed bars is shorter than the uppermost bar 62, so that an irregular distribution of the bars is obtained in the surfaces of the upper wall and the side walls, while near the rear side of the guide member the bars are not too close to each other.

In operation, the pipes 58 may bear on the ground. Since the ends 59 are bent over upwardly, it is possible to drive the device backwards without the risk of the ends of the pipes 58 penetrating or digging into the soil. It is advantageous in this case that the prolongations of the coupling arms 50 and 51 intersect each other in front of and below the pins 18 and 19. When driving backwards the coupling arms tend to deflect upwards, so that the guide member is lifted. The position of the coupling arms described ensures that, when the frame is turned with respect to the drawbar about the pivotal axes formed by the pins 8 which extend parallel to the row of rake wheels and the pins 18 and 19 for adjusting the rake wheels upwardly and downwardly, the beams 58 remain parallel to the ground surface.

When the locking pin 56 is removed from the hole in the connecting piece 54, the guide member can be tilted upwards about the pins 53. In the tilted-up position the guide member can be fixed by inserting the end of the locking pin 56 into a hole 64 in the portion of the connecting piece 54, located beneath the pin 53.

In the embodiment shown in FIG. 10 two downwardly extending arms 65 are pivoted to the pins 25. The arms are interconnected by a beam 66, to which are secured the ends of spring steel bars 67, extending obliquely downwards to the rear. The arms 65, like in the preceding embodiment, are secured against turning about the pins 25 by means of a locking pin 68. In the position shown in FIG. 10, horizontal beams 69 are secured to the lower ends of the arms 65. With the aid of cranks 70 two overlapping rake wheels 71, extending approximately parallel to a vertical plane, are coupled with the beams 69. During operative travel of the device the rake wheels are rotated by contact with the ground in the direction of the arrow C. The rake wheels thus form the side walls of a guide member for the crop and contribute to an effective displacement of the crop below the bars 67. Like in the preceding embodiments, the guide member can be tilted-up about the pins 25 and be fixed in the tilted-up position by means of the locking pin. The rake wheels preferably are also secured against turning with respect to the beams 69.

It will be obvious that instead of spring steel bars, there may be employed spring steel strips. Moreover, rigid bars or strips may also be used, which are capable of deflecting resiliently against spring pressure.

While all the embodiments described have only two rake members, it will be apparent that a device can be provided readily with more than two rake members, and a guide member for crop displaced by all the rake members.

The device for working crop shown in FIG. 11 comprises a frame including a frame beam 72, to opposite ends of which gear boxes 73 and 74 are fastened. The gear boxes 73 and 74 accommodate upwardly extending shafts 75 and 76 respectively, on which are rotatably mounted rake members in the form of rake wheels 77 and 78 respectively, shown only diagrammatically in the figure. The frame is supported by ground wheels 79, located beneath the rake wheels 77 and 78. With the frame beam 72 there is furthermore coupled a drawbar 80 by means of an apertured plate and locking pins. On the rear side of the device with reference to the intended direction of operative travel, there is provided a guide member 81 for worked or picked-up crop, which guide member comprises two upwardly extending plates 82. By means of rods 83 the plates 82 are pivoted to the frame. Downward movement of the plates is limited by a chain 84, which extends between a beam 85 mounted between the plates 82 and a support 86, secured to the frame beam 72. The guide member 81 can be pivoted upwardly into an inoperative position but is shown in FIG. 11 in an operative position in which crop can be guided onto a strip of land narrower than the working width of the device.

The rake wheels 77 and 78 have fastened to them bevel gear wheels 87 and 88 respectively, housed in the gear boxes. The teeth of the bevel gear wheel 87 engage the teeth of a bevel gear wheel 89, fastened to a shaft 90 which is journalled in the gear box 73, and one end of the shaft 90 projects forwardly of the gear box 73. The teeth of the bevel gear wheel 88 engage the teeth of a bevel gear wheel 91 fastened to a shaft 92 which is journalled in the gear box 74, and one end of the shaft 92 projects forwardly of the gear box 74. The frame beam 72 accommodates or houses a shaft 93. The end of the shaft 93 adjacent the gear box 73 is provided with a bevel gear wheel 94, and the teeth of the gear wheel 94 mesh with the teeth of the bevel gear wheel 87. The other end of the shaft 93 is provided with a bevel gear wheel 95 and the teeth of the gear wheel 95 mesh with the teeth of the bevel gear wheel 88.

The device described above operates as follows.

By means of the drawbar 80 the device can be attached to a tractor or a like propelling vehicle. The power-take-off shaft of the vehicle moving the device can be linked by means of an intermediate shaft 96 either with the shaft 90 or with the shaft 92. If the intermediate shaft 96 is coupled with the shaft 90 as shown in FIG. 11 the rake wheels 77 and 78 rotate in the direction of the arrows A and B respectively. Hence the ends of the rake wheels 77 and 78 in their passages about the shafts 75 and 76 move rearwardly in a region disposed between the rake wheels. If the intermediate shaft 96 is linked to the shaft 92, the rake wheels 77 and 78 rotate in directions opposite to the arrows A and B respectively and the ends of the rake wheels move forwardly in the region disposed between the rake wheels.

If the intermediate shaft 96 is coupled with the shaft 90 and the guide member 81 is removed or pivoted upwards so that crop cannot come into contact with the guide member, then crop lying on the ground in front of the device is picked-up and carried along by the tines of the rake members and passed rearwardly between the rake members and is spread behind the device throughout the working width of the device. If, on the other hand, the shaft 96 is coupled with the shaft 92, crop lying on the ground is displaced laterally by the tines on the rake member in the manner illustrated for the two devices shown in the upper part of FIG. 12. The crop lying on a strip of land worked during one run is thus displaced laterally to both sides of the device and is deposited on unworked strips of land at the sides of the first-mentioned strip.

As is shown in the upper part of FIG. 12, strips of land may thus be raked or worked which are spaced apart from each other by a distance approximately equal to the working width of the device. Thus the crop is collected in comparatively broad swaths C comprising unworked crop and the crop deposited by the device. The crop collected in these broad swaths C can then again be worked by the device with the intermediate shaft 96 coupled with the shaft 90, so that the crop is ejected to the rear between the rake members. If the guide member 81 for the crop is lowered into the position shown in FIG. 11, the crop is urged to pass between the rearwardly extending plates 82 so that the crop is deposited in a comparatively narrow swath D, and this swath D can be effectively worked further, for example, by a baler or a self-charging truck or trailer.

The device for working crop lying on the ground shown in FIG. 13 comprises a frame beam 97, to the ends of which gear boxes 98 and 99 are secured. The gear boxes accommodate the ends of upwardly extending shafts 100 and 101 respectively and hubs of rake members in the form of rake wheels 102 and 103 respectively are rotatably mounted on said shafts 100 and 101. The rake members comprise radial arms 104 and tines 105 are secured to the ends of the arms 104. The ends of the shafts 100 and 101 projecting below the hubs of the rake members 102 and 103 are provided with ground wheels 106 for supporting the frame.

The gear box 99 has fastened to it a plate 107, with which the end of coupling means in the form of a drawbar 109 is coupled by means of a pin 108 extending parallel to the shaft 101 and taken through aligned holes in the drawbar 109 and plate 107. The drawbar can be secured against turning about the pin 108 by means of a locking pin 110 which can be taken through holes provided in the drawbar and any chosen one of holes 111 provided in the plate 107.

The hubs of the rake members 102 and 103 are provided with bevel gear wheels 112 and 113 respectively, housed in the gear boxes 98 and 99. The teeth of the bevel gear wheel 112 mesh with the teeth of a bevel gear wheel 114, mounted on the end of a shaft 115 which is accommodated in the frame beam 97. The other end of the shaft 115 is provided with a bevel gear wheel 116, the teeth of which engage the teeth of the bevel gear wheel 113. The gear box 99 accommodates linking means in the form of a shaft 117, one end of which projects from the gear box 99. The shaft 117 is provided with a bevel gear wheel 118, housed in the gear box 99, and having its teeth engaging the teeth of the bevel gear wheel 113. The linking means also includes a shaft 119, in line with the shaft 117 and projecting also from the gear box 99, but on the opposite side of the gear box from the shaft 117. The shaft 119 is provided with a bevel gear wheel 120, housed in the gear box 99 and having its teeth also engaging the teeth of the bevel gear wheel 113.

The ends of arms 121 are pivoted to the frame beam 97 and the arms 121 are interconnected by means of struts 122. A guide member 123 for crop is pivoted to the ends of the arms 121 remote from the frame beam 97. The guide member 123 comprises two spaced obliquely ascending plates 124 which have their upper edges interconnected by a beam 125. Downward movement of the guide member 123 is limited by a chain 126 which extends between a beam 127 arranged between the front sides of the plates 124 and a support 128 which is secured to the frame beam 97 and is disposed above said beam 97. The position of the guide member 123 can be adjusted by varying the effective length of the chain 126.

The device described above operates as follows.

When the drawbar is in one operative position indicated in full lines, the device can be attached by means of the drawbar to a tractor or a similar propelling vehicle so as to be moved in the direction of the arrow A with a normally forward end facing the direction of travel. The shaft 117 can then be linked by means of an intermediate shaft 129 to the power take-off shaft of the vehicle. The rake wheels 102 and 103 are then driven so that they rotate in the direction of the arrows B and C respectively. The guide member 123 can be pivoted upwards out of the position shown with respect to the arms 121 into an inoperative position so that the beam 125 bears on the support 128. Crop lying on the ground is picked-up and displaced to the rear between the rake wheels and does not come into contact with the guide member 123, so that the crop is spread airily or in a fluffy mass on the ground behind the device.

If the crop is sufficiently dry for harvesting, the drawbar can be turned into a second operative position indicated in the drawing by broken lines and again be attached to a tractor or a similar vehicle. However, in this case, the power take-off shaft of the tractor can be linked with the shaft 119 by means of shaft 129. The device is then moved in the direction of the arrow D with a normally rear end facing the direction of travel, and the rake wheels again rotate in the direction of the arrows B and C respectively. The tines engaging the crop at the front of the device displace the crop from the front of the device to one side, with reference to the direction of travel, so that the crop lying on the strip of land which is being worked is deposited on adjacent strips of land on either side of the worked strip. In this working position it is preferred to work strips of land spaced apart from each other by a distance approximately equal to the working width of the device, and the crop is deposited on intermediate unworked strips of land. When the device is subsequently moved in the direction of the arrow A, as described above, with the guide member 123 in an operative position, along the strips of land including originally unworked crop and the crop which has been collected and deposited by the device on such unworked strips, a comparatively large quantity of crop lying on said strips of land is displaced to the rear between the rake members and comes into contact with the plates 124 of the guide member. The crop is compelled to pass in between said plates and is deposited in a comparatively narrow swath, which can be effectively worked further by means of a baler, self-charging trailer or the like. By means of a comparatively simple device the crop can thus be tedded and collected in swaths. It will be apparent that the drawbar may be replaced by other attachments. For example, linking members may be provided on either side of the device for attaching the device to the three point hitch or lifting device of a tractor or like propelling vehicle.

What we claim is:

1. A device for working crop lying on the ground comprising a frame and at least two rake members mounted on said frame, means for driving said rake members to be rotatable about generally upright axes whereby the crop-engaging parts of said rake members move rearwardly relative to the normal direction of travel in the region located between said rake members, a guide for receiving crop from said rake members being positioned to the rear of said rake members relative to the normal direction of travel, said guide being pivotally mounted on said frame for vertical movement relative to said frame.

2. A device as claimed in claim 1, wherein stop means is associated with said frame for limiting a downward pivotal movement of said guide, said guide being mounted for pivotal movement about an axis extending transversely of the intended direction of travel.

3. A device for working crop lying on the ground, comprising a frame, a plurality of rake wheels coupled with said frame, and a guide associated with said frame to the rear thereof to receive crop displaced by said rake wheels, said guide having a resilient upper wall which extends downwardly with reference to the direction of movement of displaced crop relating to said guide to direct the displaced crop towards the ground.

4. A device as claimed in claim 3, wherein said guide is provided with side walls which extend adjacent to the ground whereby a passage is defined between said side walls which converge with reference to the direction of movement of crop.

5. A device for working crop lying on the ground comprising a frame and at least two rake members mounted on said frame for rotation about generally upwardly extending axes whereby the crop-engaging parts of said rake members move rearwardly with respect to the normal direction of travel in a region disposed between said two rake members, a vertically movable guide for crop displaced by said rake members being positioned substantially behind said rake members with reference to the normal direction of travel, said guide comprising two side walls which extend rearwardly of the device in a convergent manner to define a passage which becomes gradually narrower from front to rear, the lower edges of the side walls being located, in an operative position of the guide, adjacent the ground.

6. A device as claimed in claim 5, wherein said guide has an upper wall which extends from front to rear in a downward direction, with reference to the direction of movement of crop, said side walls converging obliquely downwards from their upper sides toward the rear, said side walls being coupled with said frame to be upwardly and downwardly movable.

7. A device as claimed in claim 5, wherein said guide is upwardly and downwardly adjustable so that said guide can be raised to inoperative position, said guide being pivotable relative to further parts of said frame to be fixable in a plurality of positions.

8. A device as claimed in claim 5, wherein at least part of said guide is resiliently deflectable with respect to further parts of said guide, at least one rake wheel forming a side wall of said guide, said rake wheel having a plane which is substantially vertical, one of said sides being deflectable side ways against the action of a spring mechanism, said last mentioned side wall being pivotable about an upwardly extending shaft and said shaft being located adjacent the front side of said guide.

9. A device as claimed in claim 5, wherein a wall of said guide is composed of a plurality of spring steel bars which extend rearwardly from their fastening points with reference to the direction of movement of crop, the length of said bars being at least equal to 80 times the diameter and the rear ends of said bars being bent over in a direction away from the crop being processed, said bars being assembled to provide shorter bars between longer bars.

10. A device as claimed in claim 9, wherein two bars are interconnected near their rear ends.

11. A device as claimed in claim 10, wherein between the two bars interconnected near their rear ends there are arranged two bars of shorter length than the interconnected bars, said two shorter bars being connected with said guide solely adjacent their front ends to extend freely to the rear.

12. A device as claimed in claim 5, wherein said guide is connected to said frame by two coupling rods lying one above the other and pivoted both to the frame and to said guide, said coupling rods each have a prolongation which intersect one another in front of the foremost pivotal connections of said coupling rods with reference to the direction of travel, the point of intersection being beneath said pivotal connections.

13. A device as claimed in claim 5, wherein the lower edges of said side walls are formed by rigid bars, the rear ends of said rigid bars being bent over upwardly, the bar forming the lower edge of said side walls being integral with a U-shaped intermediate piece which interconnects the two bars and extends upwards away from said bars, the bars of said side walls being spring steel bars secured to said intermediate piece.

14. A device as claimed in claim 5, wherein the frame has a drawbar and said frame is tiltable with respect to said drawbar about a substantially horizontal axis for the vertical adjustment of the rake members.

15. A device for working crop lying on the ground, comprising a frame beam, two rake wheels mounted on said frame beam, gear boxes on said frame beam connected to said rake wheels, each gear box having a gear wheel connected to a corresponding rake wheel, and transmission means drivingly interconnecting said rake wheels, each gear box having a corresponding driving shaft connected thereto, and each driving shaft capable of being coupled to the power take-off shaft of a prime mover for moving the device during operation, whereby said rake wheels can be rotated in either of two directions according to which of the driving shafts is connected to said power take-off shaft.

16. A device as claimed in claim 15, wherein shafts on which said rake wheels are rotatably mounted extend generally upwardly, said rake wheels being mounted on portions of said shafts housed in said gear boxes and said portions project from said gear boxes.

17. A device as claimed in claim 15, wherein said frame beam is included in a frame which is located above said rake wheels, a coupling being positioned between two gear boxes whereby the device can be attached to a prime mover.

18. A device as claimed in claim 15, wherein a coupling is positioned between said two gear boxes whereby the device can be attached to a prime mover.

19. A device for working crop lying on the ground, comprising a frame and two mechanically driven rake wheels mounted in said frame, said rake wheels being rotatable about generally upwardly extending shafts, coupling means on said device for connecting same to a prime mover so that the device can be towed, said coupling means being movable between two operative positions whereby said device can be towed with a normally forward end of the device facing the direction of travel with said coupling means in one of its two operative positions and the normally rear end of the device facing the direction of travel with said coupling means in the second of its two operative positions.

20. A device as claimed in claim 19, wherein said coupling means includes a drawbar which is displaceably mounted with respect to said frame, said drawbar being mounted adjacent one end of said frame, to pivot whereby said device can be turned to the same direction as said rake wheels rotate.

21. A device as claimed in claim 19, wherein linking means is provided on either side of said frame to receive drivingly an intermediate shaft coupled with the power take-off shaft which drives the rake wheels.

22. A device as claimed in claim 19, wherein one of said rake wheels is connected to a bevel gear wheel housed in a gear box, the teeth of said bevel gear wheel being engaged by two further bevel gear wheels mounted one on each of two shafts received by said gear box and extending substantially in line with each from opposite sides of said gear box, said two rake wheels being rotatable in relative opposite directions.

23. A device as claimed in claim 19, wherein on one side of said device there is a guide for crop displaced by said rake wheels, said guide being operable to deposit displaced crop on a strip of land narrower than the working width of said device, said guide being adjustable in a substantially vertical direction.

24. A device as claimed in claim 23, wherein said guide can be moved into an inoperative position in which the crop displaced by said rake wheels does not come into contact with said guide.

References Cited

UNITED STATES PATENTS

| | | | |
|---|---|---|---|
| 2,625,000 | 1/1953 | Benbow | 56—399 |
| 2,727,347 | 12/1955 | Fenster et al. | 56—365X |
| 2,727,348 | 12/1955 | Arend | 56—372X |
| 2,832,189 | 4/1958 | McIntyre | 56—370 |
| 2,918,776 | 12/1959 | Coultas | 56—192 |
| 2,953,892 | 9/1960 | Van der Lely et al. | 56—377 |
| 3,021,904 | 2/1962 | Larson | 56—377X |
| 3,059,403 | 10/1962 | Bamford et al. | 56—377 |
| 3,092,946 | 6/1963 | Mathews | 56—192X |
| 3,181,290 | 5/1965 | Van der Lely | 56—372 |

FOREIGN PATENTS

| | | | |
|---|---|---|---|
| 1,352,635 | 1/1964 | France | 56—370 |

RUSSELL R. KINSEY, Primary Examiner